United States Patent [19]

Urman et al.

[11] Patent Number: 4,729,902

[45] Date of Patent: Mar. 8, 1988

[54] ANIMAL AND FOWL FEED SUPPLEMENT AND PROCESS OF MANUFACTURE

[75] Inventors: Robert J. Urman; Robert L. Patton, both of Phoenix, Ariz.; Joseph B. Michaelson, North Hollywood, Calif.

[73] Assignee: Control Feeds, Inc., Phoenix, Ariz.

[21] Appl. No.: 521,971

[22] Filed: Aug. 11, 1983

[51] Int. Cl.$^4$ .............................................. A23K 1/04
[52] U.S. Cl. ....................................... 426/647; 426/74; 426/521; 426/626
[58] Field of Search ............... 426/647, 807, 74, 626, 426/656, 521

[56] References Cited

U.S. PATENT DOCUMENTS

| | | | |
|---|---|---|---|
| 609,057 | 8/1898 | Sorensen | 426/647 X |
| 2,739,063 | 3/1956 | Wehrmeister | 99/2 |
| 2,965,488 | 12/1980 | Belasco | 99/2 |
| 2,996,383 | 8/1961 | Gershon | 426/647 X |
| 3,078,164 | 2/1963 | de Lisle | 99/2 |
| 3,130,054 | 4/1964 | Parker | 99/2 |
| 3,244,527 | 4/1966 | Baker | 99/2 |
| 3,352,685 | 11/1967 | Hess | 426/647 X |
| 3,539,685 | 11/1970 | de Lisle | 424/127 |
| 3,615,651 | 10/1971 | Parks | 426/647 |
| 3,617,298 | 11/1971 | Kohl | 99/2 |
| 3,767,416 | 10/1973 | Lee | 426/807 X |
| 4,219,586 | 8/1980 | Parks | 426/647 |

Primary Examiner—R. B. Penland
Attorney, Agent, or Firm—Warren F. B. Lindsley

[57] ABSTRACT

An improved method and resulting animal and fowl feed supplement involving the impregnation of diatomaceous earth with a blood serum to provide a food supplement at a reasonable cost from slaughterhouse blood.

17 Claims, 2 Drawing Figures

ANIMAL AND FOWL FEED SUPPLEMENT AND PROCESS OF MANUFACTURE

BACKGROUND OF THE INVENTION

This invention relates to comestibles and more particularly to a unique high quality protein adjuvant for the animal and fowl feed industry.

In the formulation of animal and poultry feed it is frequently desirable to include as components, materials which have peculiar and distinctive nutritional properties or flavor appeals but whose incorporation in a formulated feed presents problems in achieving uniform and effective distribution throughout the relatively dry feed masses which comprise normal or specific animal and fowl rations. This is particularly true of those feed stuff components or ingredients which are normally in liquid form and which because of their indigenous hygroscopic character do not permit of their ready drying and subsequent dry storage under normal variated temperature and relative humidity conditions.

Many animal feed millers confine their formulations to the use of normally dry components inasmuch as special equipment and skill is usually required in order to introduce wet material into dry animal feeds and to distribute them uniformly while avoiding overheating, molding, spontaneous combustion and related spoilage manifestations in the resulting comestible mixtures. For this reason, feed millers customarily purchase what are known as feed concentrates or pre-mixes for addition to, and for admixture with, the basic dry grains or meals which constitute the greater proportion of the finally formulated feed.

To this end, we have provided an improved method and product for providing the feed miller an improved animal and fowl feed product and process which combines a rendering plant's upgraded slaughterhouse blood solids or blood meal of substantially 25 to 55 percent solids, for example, with a high silicon grade diatomaceous earth having a high absorbancy and high surface area with a particle size of between 200 and 400 mesh.

With increased awareness of the scientific community to balanced animal nutrition, slaughterhouse blood is becoming increasingly important as a uniform high quality protein adjuvant to the animal and fowl feed industry.

Properly processed blood meal can supply many of the essential amino acid building blocks for growing animals not found in appreciable quantity in the feed grains. The specific amino acids found in blood meal having the greatest interest are lysine, tryptophan, methionine and threonine. It has been found, with some animal groups, that lower protein rations with balanced amino acids, including increased lysine levels, produced better results than high protein diets.

Historically, blood meal is prepared by drying, by various processes, with a wide difference of biological availability of these amino acid groups. Technology in drying blood, in recent years, has not made many new advances further than the steam drying method and the ring flash dryer, with the ring flash dryer producing a high quality product of high biological retention of the critical amino acids, but at the sacrifice of product cost due to a high energy demand to produce the product.

Seven to ten tons of raw mammal blood (depending on percentage of blood solids) are required to produce one ton of ring dried blood meal. In this process, raw blood is coagulated by steam, centrifuged to dewater to 40 to 50 percent blood solids, then passed through the high temperature ring dryer by air entrainment. The product produced is used primarily to enhance the protein value of other supplemental feed products.

DESCRIPTION OF THE PRIOR ART

Although blood meal has been prepared and used as a feed supplement, the wide differences in the available amino acid groups in the resulting product and the high energy costs of the drying cycle needed to produce the blood meal has left room for improvement not only in the product but also in the cost of producing it.

Diatomaceous earth has been used in small quantities in poultry feed as evident from U.S. Pat. No. 3,271,161 to increase egg production and to promote growth.

U. S. Pat. No. 3,539,685 teaches the use of diatomaceous earth to eliminate worms from infected animals.

U. S. Pat. No. 3,617,298 teaches the coating of a nitrogenous source material with a coating of diatomaceous earth and then with a palate inducing material to retard the release of nitrogen within the livestock.

U.S. Pat. No. 3,078,164 describes a method for the extraction of nutrients from such dilute solutions as raw whey. This patent teaches the repeated steps of combining controlled amounts of the dilute solution with a pulverulent absorptive infusible solid such as diatomaceous earth followed by a drying process.

U.S. Pat. No. 3,130,054 discloses a method of producing a food supplement composed of animal and/or vegetable tissues, exudates, sera, extracts and the like integrated with a sponge-like material such as exfoleated or expanded vermiculite.

U.S. Pat. No. 2,965,488 discloses ruminant feed compositions comprising urea, natural protein, carbohydrates and various additives.

U.S. Pat. 2,739,063 discloses a bacitracin feed supplement absorbed on an activated clay wherein the pH of a fermentation liquor is controlled.

U.S. Pat. No. 3,244,527 discloses a cattle feeding process, compositions and product wherein a chemically inert amorphous silica particle of a size between $-10$ and $+50$ mesh is used.

U.S. patent application Ser. No. 342,083 filed by two of the inventors Jan. 25, 1982 and entitled Whey Processing Method and Animal Food Supplement utilizes diatomaceous earth as a carrier for concentrated whey products.

None of these patents as well as others known to the inventors including technical publications teach the process and resulting product disclosed and claimed herein wherein slaughterhouse blood solids are combined with a high silicon grade diatomaceous earth having a high absorbancy and high surface area with a particle size between 200 and 400 mesh to provide an animal and fowl feed supplement.

SUMMARY OF THE INVENTION

In accordance with the invention claimed, a new and improved method and product is provided for the conversion of slaughterhouse blood into a useful and commercially feasible animal and fowl food supplement.

It is, therefore, one object of this invention to provide a new and improved method for the conversion of slaughterhouse blood into an animal and fowl food supplement or feed additive.

Another object of this invention is to provide a method in a form that is commercially feasible with existing equipment such that the price commanded by the end product substantially exceeds production costs and the costs of competitive feed supplements.

A further object of this invention is to provide a method utilizing diatomaceous earth as an obsorptive solid for blood meal, a slaughterhouse by-product.

A still further object of this invention is to provide a method for producing an animal and fowl food supplement using blood meal and a suitable grade of calcined and uncalcined diatomaceous earth as the basic raw materials.

A still further object of this invention is to provide such a method that limits processing time and costs by eliminating the high temperatures of the prior art necessary to totally lysis blood cells to destroy any fungus and bacteria organisms therein.

A still further object of this invention is to provide an alternate method of treating blood meal with an acid solution treatment to avoid the need for the high temperature treatment of the prior art.

A still further object of this invention is to provide such a method which limits processing time and temperatures to a sufficiently low level as not to degrade the nutritional value of the end product.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing in which.

DESCRIPTION OF THE PREFERRED EMBODIMENT

Figure 1:
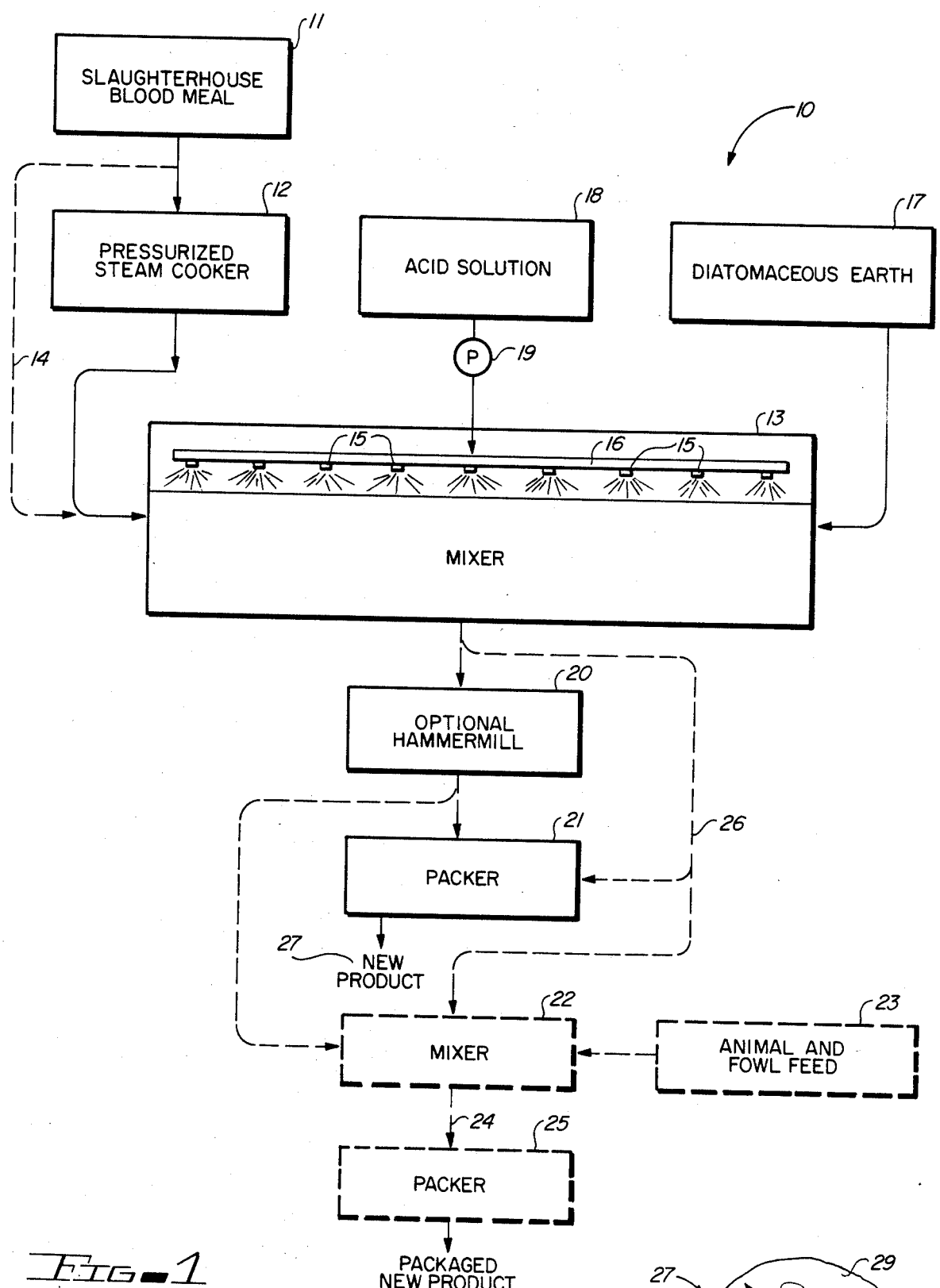
FIG. 1 is a diagrammatic representation of the process of the invention.

Referring more particularly to the drawing by characters of reference, FIG. 1 discloses a new and improved process and resulting product which combines a rendering plant's upgraded slaughterhouse blood solids containing, for example, from 25 to 55% total solids, with a high silicon grade diatomaceous earth having a high absorbancy rate and high surface area with a particle size, for example, between 200 and 400 mesh.

The slaughterhouse blood can be derived from any mammallian animal source which may be cooked under pressure for a short period of time to ensure total lysing of the blood cells and to destroy contaminating bacteria.

The diatomaceous earth is a deposit of shells of unicellular plants; i.e., the diatoms which are microscopic, aquatic, single-celled algae which are found both in the sea and in fresh water lakes and ponds. The individual diatom consists of a living cell enclosed by two half-cell walls which are called valves. The diatoms extract silica from their environment and deposit it in the valves. When the diatom dies, it sinks to the bottom of the body of water and the organic matter is decomposed, leaving the hard siliceous shell or valves. Constant leaching over thousands of years has eliminated most of the extraneous material so that the deposits of diatomite, made up of great numbers of these diatom valves, are relatively pure.

Diatomaceous earth is mined in California, Oregon, Washington, Nevada, and Arizona. It has many commercial uses, one of the most commonly known being as a filtering material as employed, for example, in swimming pool filters. In the case of the filtering application, the diatomite is first burned or calcined to convert the various chemical constitutents into oxides which are not digestible. In the use defined by the present invention, the uncalcined product is preferably employed which includes digestible carbonates and other minerals of importance in animal diets.

While numerous mining operations exist in the areas referenced, very few deposits exist in the U. S. in which the contents of heavy metals and other contaminants are less than the maximum permissible level for animal consumption as stipulated by the National Academy of Sciences. Typical specifications for this material are as follows:

Silica derived from diatoms: 80–92%

Dry density (pounds/cubic foot): 8–20

Particle size (microns): 0.1–44

Water absorption (g/100 g of diatomaceous earth: 100–200

Trace mineral content within acceptable levels as stipulated by National Academy of Sciences As shown in FIG. 1, the new and improved process 10 comprises the optional step of cooking the slaughterhouse blood meal 11 which contains from 25 to 55 percent total solids in a standard industrial steam cooker 12 which is pressurized to approximately 30 PSI steam pressure for approximately 15 to 30 minutes. This procedure totally lysis any remaining blood cells to expose interior moisture and destroys all fungus and bacteria organisms thereby serving as a sanitizing procedure. It should be noted that this pressurized steam cooking of the blood meal is an optional step since the total lysing of the blood meal and destruction of the contained microorganisms would occur in a later described acid treatment of the mixed diatomaceous earth and the blook meal 11.

For purposes of this disclosure, raw slaughterhouse blood is coagulated and centrifuged to approximately 50 percent solids to provide the blood meal 11.

With reference to FIG. 1, blood meal 11 is either cooked in the pressurized steam cooker 12 and then transmitted to a high speed blending mixer 13 or transmitted directly to mixer 13 from the source of the blood meal 11 as indicated by the dash flow line 14. In mixer 13 blood meal 11, which now has the consistency of wet coffee grounds, is fine mist sprayed with an acid solution by nozzles 15 of a pressure line 16 positioned within mixer 13 as shown in the drawing.

Mixer 13's pressure line 16 and its associated nozzles 15 provide for the mixing of a liquified material; i.e., acid solution, with the blood meal prior to the introduction in the mixer of a diatomaceous earth 17. Pipe line 16 and its associated jets or nozzles 15 are merely one example of a means for spraying the liquid acid solution on the mixing blood meal. Other forms of acid treatment may be used and fall within the scope of this invention.

Mixer 13 may be a paddle type wherein particulate material is continually circulated throughout a chamber. The mixer blends or mixes the blood meal 11, which is first sprayed with an acid solution, with a relatively dried particulate diatomaceous earth 17 in the particular sequence described to cause an intimate blending thereof.

As shown in the drawing, the liquid sprayed on the mixing blood meal in mixer 13 comprises an acid solution 18 which is pumped into pipe line 16 and through nozzles 15 in a jet-like manner by a pump 19. As will be appreciated, a controlled amount of acid is fed into mixer 13 to reduce the pH of the total mass of blood meal to an acid pH rating of less than 2, including such low pH rating as 0.1, thereby serving as a sanitizing agent.

A variety of acids at different strengths can be used; however, for many reasons, hydrochloric acid, being compatible with a feeding animal's digestive system, is used in this example. The dilution of acid again is determined for the purpose of this example to be, for example, approximately 10 percent by weight aqueous solution of hydrochloric acid. Other dilutions of acid varying from 5 to 50 percent can also be used. At the end of this acid solution treatment of the process disclosed, all organisms found as contaminants in blood are destroyed and the blood mass is rendered harmless against any organism growth from outside recontamination. The acid has now also begun to alter the crude protein of the blood meal in long chain molecules into shorter chain amino acid molecules making their nutritive value more quickly available to a feeding animal.

After the acid treatment of the blood, the diatomaceous earth 17 is introduced into the mixer 13 in the proper weight ratio and the total mass is allowed to mix thoroughly. Such a predetermined ratio may be, for example, one-to-one, one-to-two or one-to-three ratios by weight. Mixing is accomplished very easily; the dry diatomaceous earth has a natural affinity to the high moisture blood mass, encapsulating each blood particle with an absorbing insulating cover. The acidified blood serum is absorbed into the diatom where the moisture level of the total mass finds an equilibrium. The diatomaceous earth being a neutral absorbant and the blood mass having a pH of about 2, the total mixture of the product that has passed through the pressurized steam cooker 12 now has a pH of less than 3 and may be as low as 0.1, sufficient in acidity to discourage new bacteria growth, yet not excessive to a feeding animal when fed at an already approved feed ratio not exceeding 3 percent of total dry ration.

In the case of blood meal not run through the pressurized steam cooker 12, the pH of the blood is adjusted to arrive at a finished product comprising blood meal and diatomaceous earth approximately of a pH rating of 2.

The next step in the process procedure, which may be optional, is to run the total product mass through a hammermill 20 of determinate screen size to break up any overly large blood particles to a more uniform size. Again, as blood particle surfaces are exposed by milling, there is the immediate recoating of the surfaces with the diatomaceous earth and more thorough mixing is accomplished. The product is now ready for the bag plant packer 21, transport storage, or admixing in mixer 22 with other meat, bone or other animal by-products 23 to formulate other new nutritionally balanced animal feed products 24 which is packaged by packer 25.

As evident by the dash line 26, the acid treated blood meal 11 and diatomaceous earth 17 mixture from mixer 13 may be transmitted directly to mixer 22 where it is mixed with the animal and fowl feed 23 without going through the hammermill 20.

Exhaustive bacterialogical testing has concluded our new product to have a bacteria individual count of zero over at least 30 days of incubation. At the pH levels used in the disclosed sample, the soil-borne bacteria introduced to the blood from the diatomaceous earth was also rendered to no growth. As most animal by-products are utilized by the feed industry quickly, further sanitization of diatomaceous earth is not required however, if because of some microorganism problems occurring, a form of diatomaceous earth known as "calcined" (flash burned at 1200°–1300° F. to reduce carbonates to oxides) eliminates fungus and is available in the marketplace for use.

In accordance with the invention disclosed and claimed, a new process and resulting product is provided which uses the same amount of raw blood input to produce six times the amount of new product than the ring dried product of the prior art while reducing the energy demand by not needing the blood drying functions of the prior art and thus greatly reduces the manufacturing costs per ton of the resulting feed supplement.

Extensive culture tests have determined the claimed stabilized product to be immune to outside bacterial contamination as well as interior bacteria growth which causes decomposition or denitrogenization of the proteins therein, thereby giving the claimed product a reasonable storage life before incorporating it into an integrated feed mix, with no extraordinary precautions necessary.

In addition, the stabilization phase of the claimed process enhances the biological availability of the amino acid groups resulting from a breaking down of the long chain molecules of crude blood protein into shorter chain amino acids or, in other words, a "pre-digestion" is occurring.

The blood serum which is retained by absorption into the diatom contributes an approximate 20 percent crude protein retention efficiency over the flash dried blood meal of the prior art.

The diatomaceous earth, in addition to its main function of an increased contact utilizer between digestive enzymes and amino acids by absorption, encapsulates and insulates the blood solid particles, giving the new product excellent handling and mixing capabilities.

The resulting product from the new process disclosed results in the following advantages over prior art products.

1. Energy costs reduced by eliminating drying process.
2. Blood serum nutrients retained.
3. Decomposition of resultant product to make it resistant against bacterial contamination and breakdown.
4. "Pre-digestion" of crude protein contained in product for faster utilization.
5. Improved handling (anti-caking) and mixability characteristics.
6. Mixable with other meat by-product supplements to balance amino acid and moisture percentages.
7. Increased protein utilization of entire feed ration.
8. Fly-odor control in manures.
9. Trace mineral availability in chelates form.
10. Totally natural product.
11. Meets AAFCO and FDA requirements up to 3% of total dry ration.

12. Six times product production from same input of raw blood, giving many options for other new feed supplement mixes.

Figure 2:
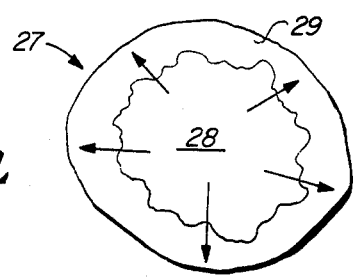
FIG. 2 is a schematic elevational view, greatly enlarged, showing a particle of the new food supplement.

FIG. 2 illustrates, in an exaggerated schematical form, a single product aprticle 27 produced in accordance with the principles of the invention. A centralized acidized blood meal particle 28 is provided with a covering of diatomaceous earth 29 into which is absorbed blood serum from the blood meal particle 28 where the moisture level of the total mass finds an equilibrium. A plurality of such particles forming the new product disclosed is free-flowing, anti-caking, and stable over a wide variety of temperature and atmospheric conditions thereby suitable for long periods of storage and/or immediate use with or without the addition of other natural protein sources. The finished product particles contain a limited amount of moisture and are relatively nonhydroscopic, allowing mixture thereof with various minerals and vitamins and/or other natural protein sources without encountering processing difficulties requiring expensive equipment.

An effective new process is disclosed which produces as an end product a valuable animal and fowl food or feed supplement in accordance with the stated objects of the invention and, although but a few embodiments of the invention have been illustrated and described, it will be apparent to those skilled in the art that various changes and modifications may be made therein without departing from the spirit of the invention or from the scope of the appended claims.

What is claimed is:

1. A method of converting a moist blood concentrate into an animal and fowl food supplement comprising the steps of:
    dewatering a predetermined quantity of raw mammal blood to approximately 40 to 50 percent of its volume forming a moist blood concentrate and then drying the resulting moist blood concentrate to a predetermined moisture content,
    blending the moist blood concentrate in a mixer,
    treating the moist blood concentrate in the mixer with an acid solution to control its pH rating, thereby forming an acidified product,
    said acidified product comprising a given solid particle content and a liquid blood serum, and
    mixing together with the acidified product diatomaceous earth comprising diatoms in a substantially one-to-one ratio by weight with the acidified product until the diatomaceous earth encapsulates the particles of said concentrate and the blood serum is at least partially absorbed into the diatoms with the pH value of the resulting food supplement approximately 2.

2. The method set forth in claim 1 wherein:
    the acid solution comprises an aqueous solution comprising a concentration of approximately 5 to 50% by weight of hydrochloric acid.

3. The method set forth in claim 1 wherein:
    the resulting mass has an acidity pH value of less than 2.

4. The method set forth in claim 1 wherein:
    said acidified product and said diatomaceous earth are mixed in a substantially one-to-two ratio by weight.

5. The method set forth in claim 1 wherein:
    said acidified product and said diatomaceous earth are mixed in a substantially one-to-three ratio by weight.

6. The method set forth in claim 1 wherein:
    the pH rating of the resulting acidified product is sufficient to ensure substantially total lysing of the blood cells and rendering the total acidified product incapable of microorganism growth.

7. The method set forth in claim 1 wherein:
    said diatomaceous earth comprises 80 to 92% of silica derived from diatoms, a density of between 8 and 20 pounds per cubic foot, a particle size of between 0.1 and 44 microns, a surface area of between 20,000 and 50,000 square meters per gram, blood serum absorption of between 100 and 200 grams per 100 grams of diatomaceous earth and a trace mineral content.

8. The method set forth in claim 1 in further combination with the step of:
    crushing said resulting food supplement to a size small enough to pass through a screen of between 200 and 400 mesh size.

9. The method set forth in claim 8 wherein:
    the resulting mass has an acidity pH rating of under 2.

10. The method set forth in claim 9 wherein:
    the acid solution comprises an aqueous solution comprising a concentration of approximately 5 to 50% by weight of hydrochloric acid.

11. The method set forth in claim 9 wherein:
    said acidified product and said diatomaceous earth are mixed in a substantially one-to-two ratio by weight.

12. The method set forth in clam 9 wherein:
    said acidified product and said diatomaceous earth are mixed in a substantially one-to-three ratio by weight.

13. The method set forth in claim 9 wherein:
    the pH rating of the resulting acidified product is sufficient to ensure substantially total lysing of the blood cells and rendering the acidified product incapable of microorganism growth.

14. The method set forth in claim 9 in further combination with the step of:
    crushing said resulting food supplement to a size small enough to pass through a screen of between 200 and 400 mesh size.

15. The method set forth in claim 1 in further combination with the step of:
    steam pressure cooking the blood concentrate at approximately 30 pounds per square inch pressure for approximately 15 to 20 minutes prior to blending the blood concentrate in said mixer.

16. The method set forth in claim 15 wherein:
    the resulting mass has an acidity pH rating of from 0.1 to 2.

17. A method of converting a moist blood concentrate into an animal and fowl food supplement comprising the steps of:
    dewatering a predetermined quantity of raw mammal blood to approximately 40 to 50 percent of its volume forming a moist blood concentrate and then drying the resulting moist blood concentrate to a predetermined moisture content,
    sanitizing the moist blood concentrate to destroy fungus and bacteria organisms,
    said concentrate comprising a given solid particle content and a liquid blood serum, and
    blending said concentrate in a mixer with diatomaceous earth comprising diatoms in a substantially one-to-one ratio by weight until the diatomaceous earth encapsulates the particles of said concentrate and the blood serum of said concentrate is at least partially absorbed into the diatoms with the pH value of the, resulting food supplement being approximately 2, thereby keeping microorganisms from growing in the diatomaceous earth for a predetermined period of time.

* * * * *